(12) United States Patent
Epstein

(10) Patent No.: US 8,284,191 B1
(45) Date of Patent: Oct. 9, 2012

(54) THREE-DIMENSIONAL WIRELESS VIRTUAL REALITY PRESENTATION

(75) Inventor: Joseph Epstein, Fremont, CA (US)

(73) Assignee: Meru Networks, Sunnyvale, CA (US)

( * ) Notice: Subject to any disclaimer, the term of this patent is extended or adjusted under 35 U.S.C. 154(b) by 738 days.

(21) Appl. No.: 12/418,292

(22) Filed: Apr. 3, 2009

Related U.S. Application Data

(60) Provisional application No. 61/042,646, filed on Apr. 4, 2008.

(51) Int. Cl.
*G06T 15/00* (2011.01)
(52) U.S. Cl. .......................... 345/419; 715/757
(58) Field of Classification Search .................. 345/419; 715/757
See application file for complete search history.

(56) References Cited

U.S. PATENT DOCUMENTS

| | | | |
|---|---|---|---|
| 5,038,151 A | 8/1991 | Kaminski | |
| 5,966,094 A | 10/1999 | Ward et al. | |
| 6,760,318 B1 | 7/2004 | Bims | |
| 6,788,658 B1 | 9/2004 | Bims | |
| 6,839,038 B2 | 1/2005 | Weinstein | |
| 6,894,649 B2 | 5/2005 | Ostervall | |
| 6,933,909 B2 | 8/2005 | Theobold | |
| 6,954,177 B2 | 10/2005 | Channabassappa et al. | |
| 6,978,158 B2 | 12/2005 | Ghavami | |
| 7,319,685 B2 | 1/2008 | Kim et al. | |
| 7,333,455 B1 | 2/2008 | Bolt et al. | |
| 7,359,362 B2 | 4/2008 | King et al. | |
| 2005/0152314 A1 | 7/2005 | Sun et al. | |
| 2006/0019679 A1* | 1/2006 | Rappaport et al. ......... 455/456.5 | |

OTHER PUBLICATIONS

Habib et al. "Multi-antenna techniques for OFDM based WLAN." Proceedings of First International Conference on Next-Generation Wireless Systems, Jan. 2006, pp. 186-190.
Kitahara et al. "A base station adaptive antenna for downlink transmission in a DS-CDMA system." IEEE 51st Vehicular Technology Conference Proceedings, 2000 (Abstract).
Mahler et al. Design and optimisation of an antenna array for WiMAX base stations. IEEE/ACES International Conference on Wireless Communications and Applied Computational Electromagnetics, 2005 (Abstract).
Miaris et al. "On the base stations antenna system design for mobile communications." Electrical Engineering, 2006, pp. 157-163, vol. 88.
Miura et al. "Study of array pattern tuning method using hybrid genetic algorithms for figure-8 satellite's earth station antenna." Asia-Pacific Microwave Conference Proceedings, 2000 (Abstract).
Ponnapalli et al. "Design and packaging of antennas for wireless systems." Proceedings of Electrical Performance of Electrical Packaging, 1995 (Abstract).
Sarolic. "Base station antenna near-field radiation pattern distortion analysis." Sixth International Conference on Computational Methods for the Solution of Electrical and Electromagnetic Engineering Problems Incorporating Electromagnetic Effects on Human Beings and Equipment Seminar, 2003 (Abstract).

* cited by examiner

*Primary Examiner* — Maurice L McDowell, Jr.

(57) ABSTRACT

The invention provides techniques, including methods and systems, capable of displaying wireless network information regarding various wireless parameters in a three-dimensional (3D) virtual reality environment. The methods and systems provide graphical information to permit a network administrator to view and alter the wireless network virtually at one or more remote locations without being physically present at the remote location.

28 Claims, 14 Drawing Sheets

THREE-DIMENSIONAL WIRELESS VIRTUAL REALITY PRESENTATION

CROSS REFERENCE TO RELATED APPLICATION

This application claims priority from U.S. Provisional Application No. 61/042,646, filed Apr. 4, 2008, titled "Three-Dimensional Wireless Virtual Reality Presentation," in the name of the same inventor, hereby incorporated by reference as if fully set forth herein.

SUMMARY OF THE DESCRIPTION

The invention provides techniques, including methods and systems, capable of displaying information in a three-dimensional (3D) virtual reality environment. The methods and systems provide graphical information to permit a user to configure, view, monitor and manipulate the 3D virtual reality environment at one or more remote locations without being physically present at the remote location.

DETAILED DESCRIPTION

In the description herein, a preferred embodiment of the invention is described, including preferred process steps and data structures. Those skilled in the art would realize, after perusal of this application, that embodiments of the invention might be implemented using a variety of other techniques not specifically described, without undue experimentation or further invention, and that such other techniques would be within the scope and spirit of the invention.

The scope and spirit of the invention is not limited to specific examples mentioned therein, but is intended to include the most general concepts embodied by these and other terms.

Figure 1:
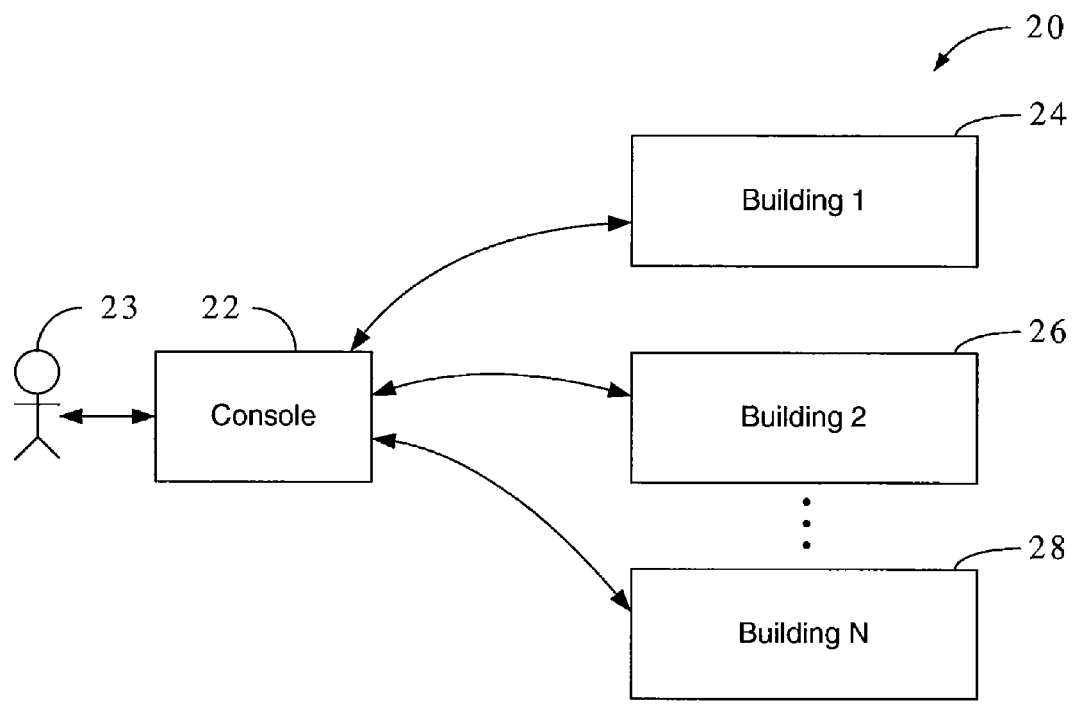
FIG. 1 illustrates a user console for remotely monitoring and controlling networks at remote sites.
Figure 2:
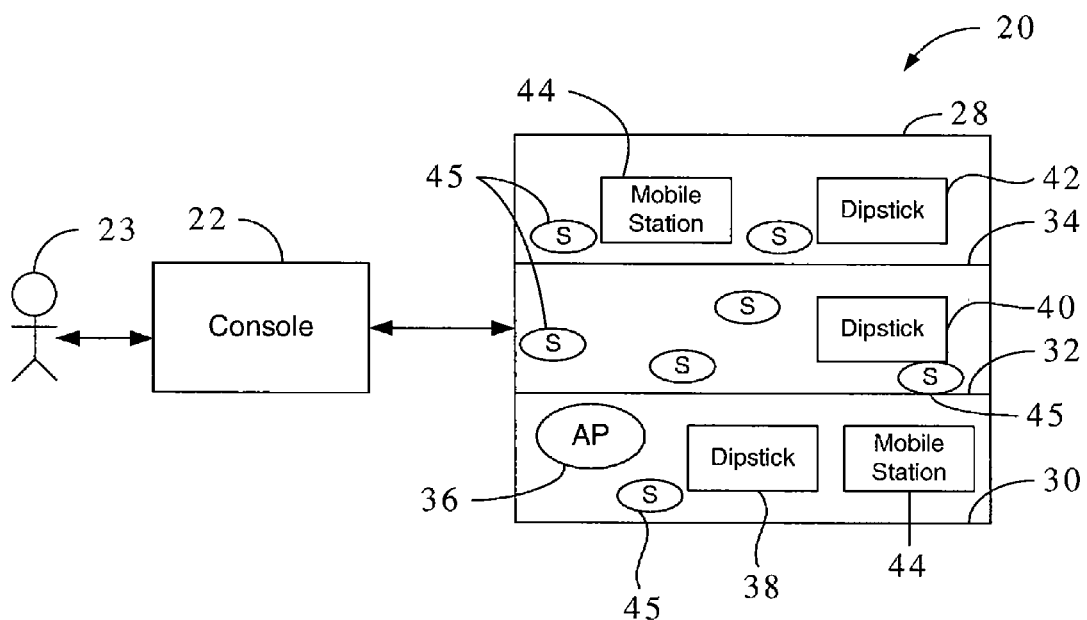
FIG. 2 illustrates the user console for remotely monitoring and controlling the network at one of the remote sites of FIG. 1.
Figure 3:
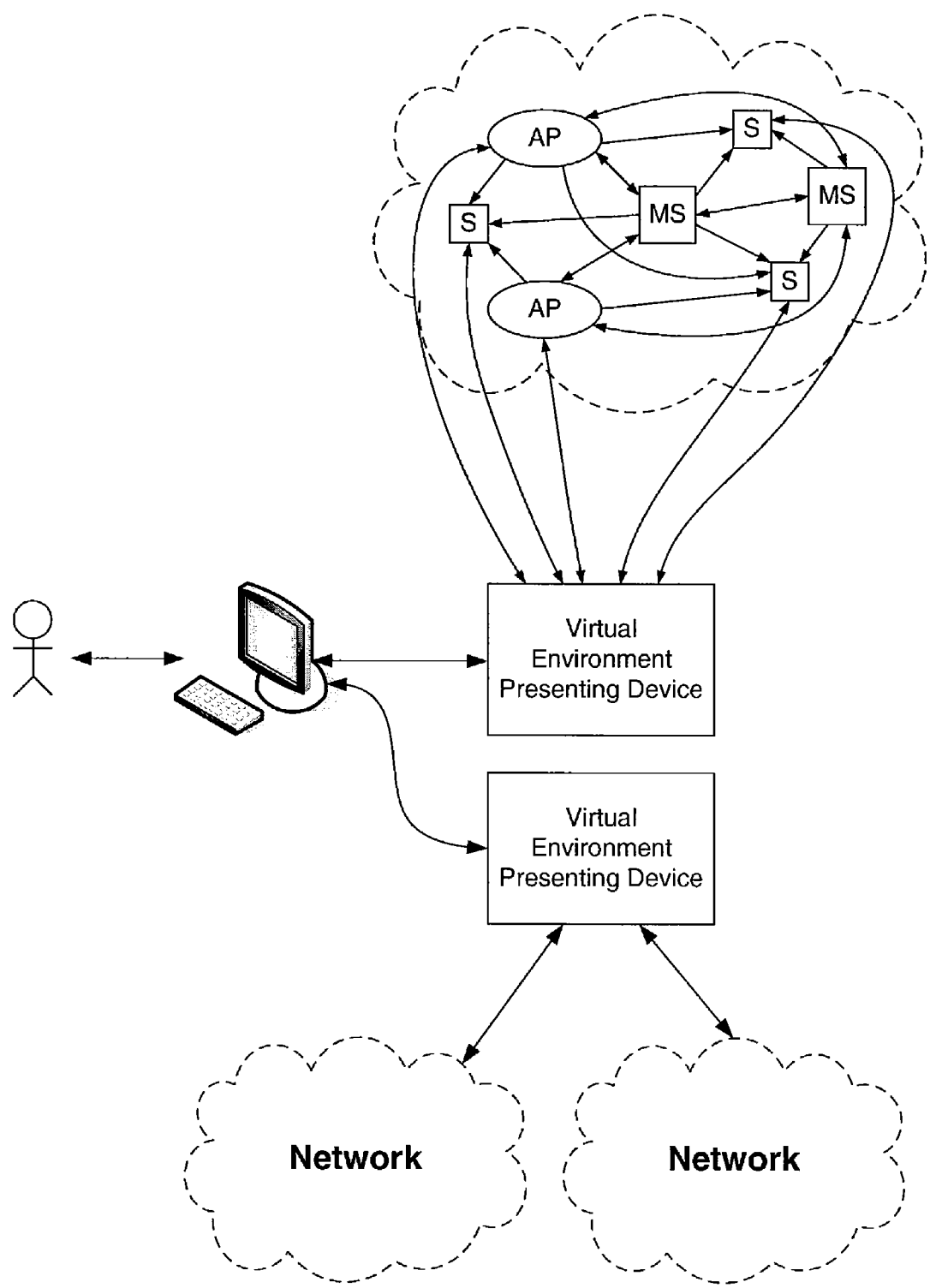
FIG. 3 illustrates the interaction between devices in a network with data received by a virtual environment presenting device and displayed on a user console.
Figure 4:
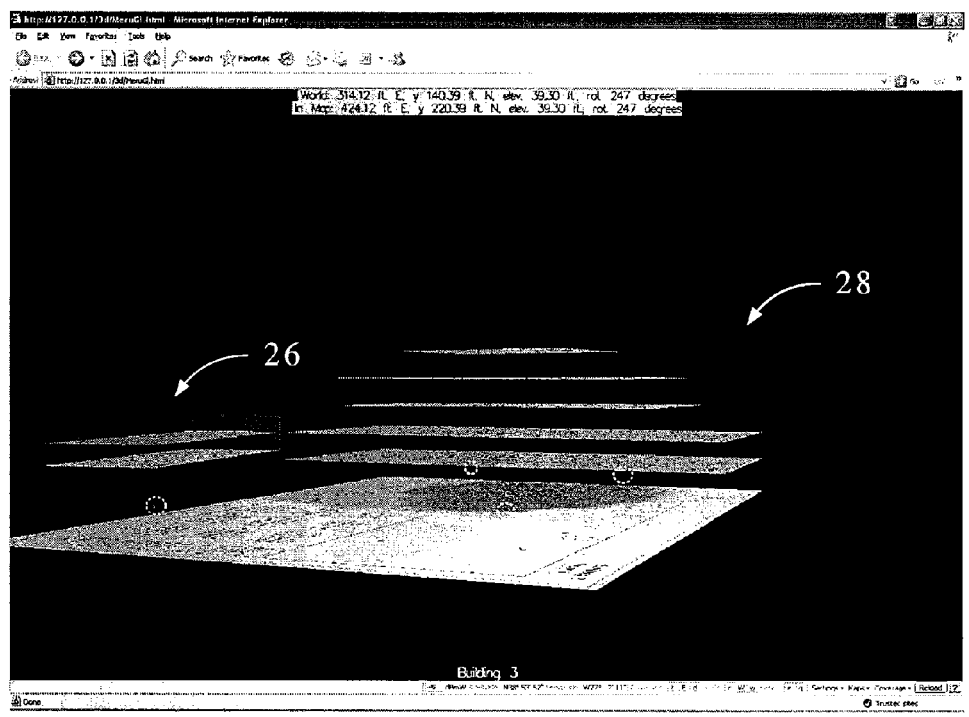
FIG. 4 illustrates a virtual reality environment of the remote site of FIG. 2 viewed from a distance and displayed on the user console.
Figure 5:
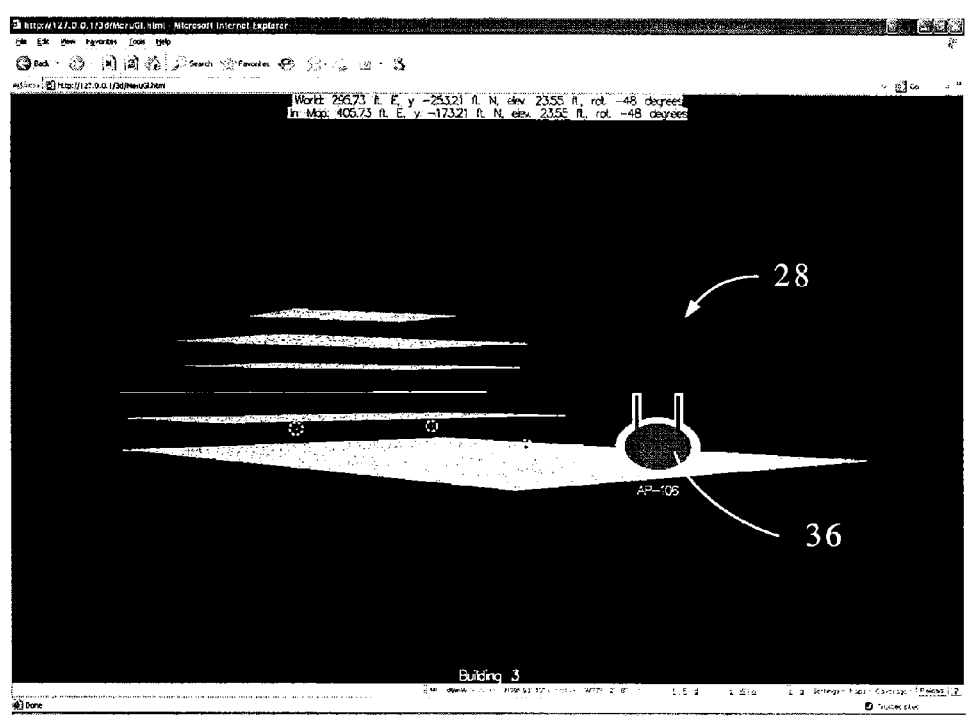
FIG. 5 illustrates the VR environment of FIG. 4 viewed from a different angle and showing a wireless access point for the remote site.
Figure 6:
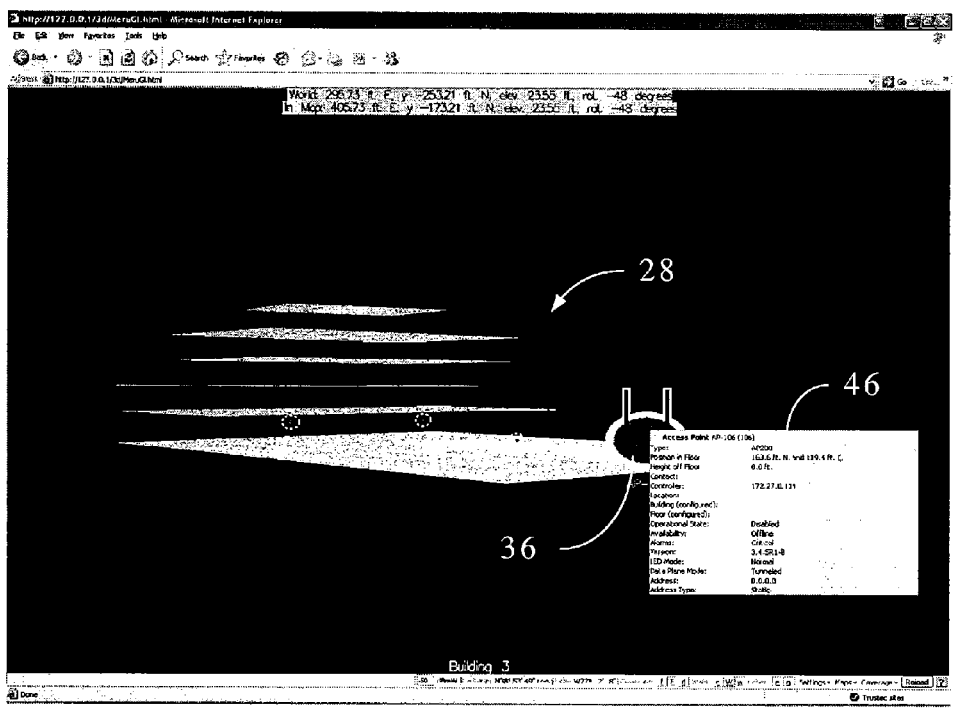
FIG. 6 illustrates the VR environment of FIG. 5 with the AP parameters displayed.

Referring initially to FIGS. 1-3, a diagram of a system to monitor and control wireless network parameters is generally indicated by reference numeral 20. A console 22 may be used by a user 23, such as a network administrator, to display network parameters for remote sites 24, 26 and 28, which may be separate buildings or separate networks within a single building.

From the console 22, the user 23 may remotely monitor and control network parameters for a building 28 with three physical floors 30, 32 and 34, for example. One or more wireless network access points (AP) 36 may be located on one floor 30 or at different locations within the network, with sensors or dongles 38 providing measurements of network parameters from various locations within the building 28. One or more mobile stations 40 within the network environment may be used to measure network parameters and may be monitored by the APs 36 and sensors 38. The APs 36 and sensors 38 may be used to identify and locate the mobile stations 40 or other network devices 42 within the building 28. Information received by the APs 36 and sensors 38 may be collected by a virtual environment presenting device 44 for display on the console 22 or may be sent directly to the console 22.

Referring to FIGS. 4-7, the virtual reality environment may be displayed on the console 22 and viewed by the user 23 from any angle or perspective. The building 26 and 28 may be represented as planes in space with the planes representing the floors of the buildings. For example, building 26 may have two floors and building 28 may have six floors. Although the floors are depicted as rectangular planes, it should be understood that any shape and layout may be used. Additionally, other features such as elevators, ramps, staircases, balconies and stairwells, for example, may also be included.

The 3D environment may be built by a user by positioning physical obstructions in a virtual space. For example, the user may input coordinates for a floor by specifying the longitude, latitude and elevation for each corner of the floor. The coordinates may be actual coordinates corresponding to the building being modeled or represented, or may be coordinates in a 3D space created by the user. Floors and ceilings may be combined with the ceiling displayed as the underside of the next above floor, or may be separately specified. Alternatively, a floor plan for each floor may be loaded and a building based on these floors automatically created by the system.

The floor plan to be loaded might take the form of (a) a blueprint or other graphic description of a designated floor, (b) a specification in a variant of HTML, XML, SGML, or another language of similar type, (c) a set of physical sensor readings, e.g., measurements taken using laser or sonic distance measuring, or (d) some other technique capable of specifying for the most part any ceilings, floors, walls, stairwells, elevators, or other obstructions or objects which might have an affect either on the electromagnetic characteristics of the building or on the ability of persons and objects to move about the building.

Once the floors of the virtual building are specified, the user may load one or more images to be selectively projected onto the floor and/or ceiling. Separate images may be loaded for each floor. The images may be viewed or hidden as desired by the user. An image may include a plan view of an office space with lines for cubicle walls, desks and chairs shown, for example. Other images may be loaded which specify the locations of walls and the physical composition of the walls (or other obstructions or objects likely to be positioned in the building, e.g., common area furniture, artwork, and the like).

The system 20 may automatically determine the location of walls based on coordinates input and/or images loaded. Physical properties of the walls may be specified by the user such as material (drywall, concrete, metal or wood studs), as well as RF properties such as attenuation, and any other properties that might be relevant to administration of the network, for example. Alternatively, the system may assign an attenuation value to the walls which may be changed by the user or automatically adjusted by the system based on field measurements.

The location of important objects such as APs 36, sensors 38, signal repeaters, network infrastructure or other network devices, or non-network items of interest may be loaded and/or specified by the user. The location of active devices such as APs 36 and mobile stations 40 may be discovered automatically by the system and displayed. The location of passive devices, such as clients and sensors 38, may also be discovered automatically by the system and displayed. The user may manipulate the view and perspective by zooming in or out and rotating the building or moving around the building in virtual space using a mouse or keyboard, with or without having the virtual space display objects as opaque, translucent, transparent, or otherwise.

Network devices such as the AP 36 may be displayed (either without parameters shown, as in FIG. 5, or with parameters shown, as in FIG. 6) or hidden by the user. In one embodiment, the exterior and interior walls of building 28 are not displayed in order to avoid obscuring the user's view of the virtual environment. The network parameters may be overlaid on the VR environment without interfering with the user's view of the physical aspects of the world that the VR environment is representing. Thus, the user can maintain a "natural" view of the physical world without having the view obstructed by the network parameters. The network parameters may be presented as surface color, brightness or texture, for example, of physical objects, or possibly as "heads-up-display" elements that don't block the user's view.

Information and parameter settings of the AP 36 may be displayed by moving the cursor over the AP 36, or otherwise selecting the AP 36. From this popup menu 46, the user can monitor the operational performance of the AP 36 and change its settings as desired.

Figure 7:
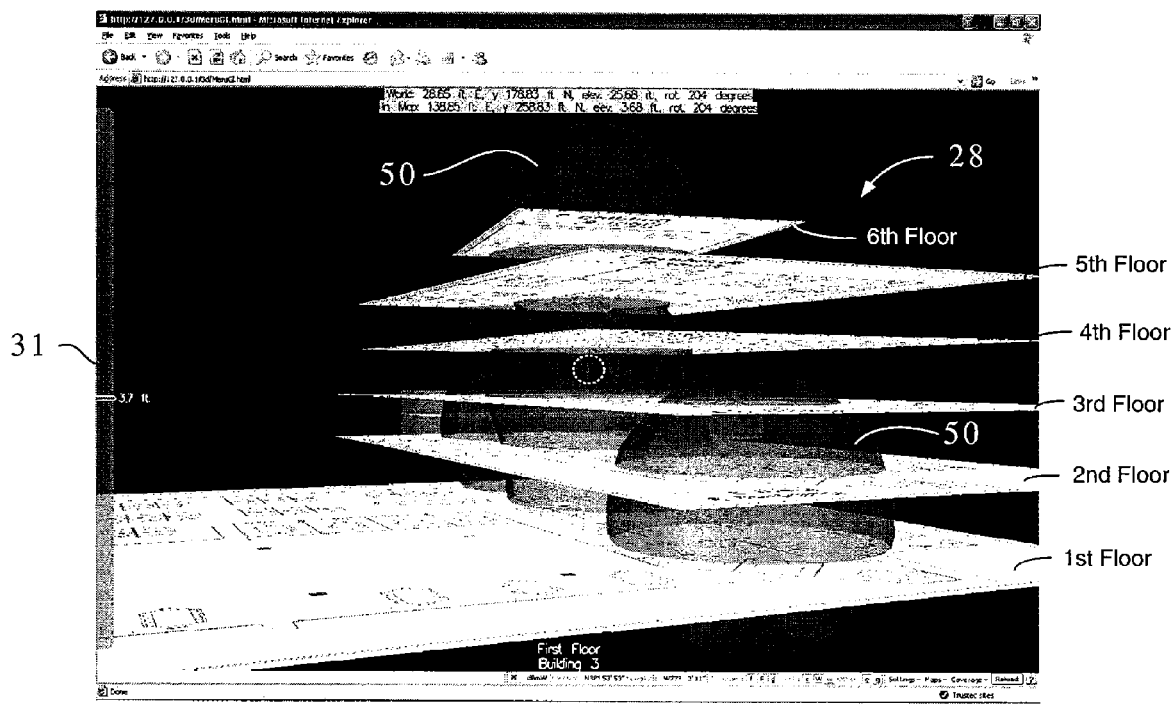
FIG. 7 illustrates the VR environment of FIG. 4 viewed from a different angle and zoomed-in, and showing wireless fields.

Referring to FIG. 7, virtual building 28 is illustrated with the wireless network fields displayed as fields 50, each representing a 3D isobar of the wireless network field, representing (in this case) a selected power level cutoff, from a vantage point outside the building. In alternative embodiments, the 3D isobars might represent another parameter of interest, e.g. signal-to-noise ratio. An altimeter 31 is displayed showing the elevation of the viewer. As illustrated in FIG. 7, the user is floating in space at an elevation of 37 feet relative to the first floor. In one embodiment, the walls of the building 28 are not displayed, as selected by the user, to allow the user to have an unobstructed view of the inside of the building and the network fields.

The fields 50 extend through the floors of the building 28, illustrated as opaque planes. The boundary of the fields 50 may be determined based on measurements made at various points within the building and projected on the 3D representation and virtual reality presentation of a wireless network. The wireless field 50 may be represented by a translucent bubble having a color indicative of the field strength or other measured or calculated wireless parameter, at any point within the field. In alternative embodiments, other distinctive features may be substituted for color, e.g., texture, grey-scale, or some other distinguishing feature. The wireless field may be measured at a particular reference point within the field such as at a height of three to four feet, for example, and this reference point may be chosen manually or automatically.

Figure 8:
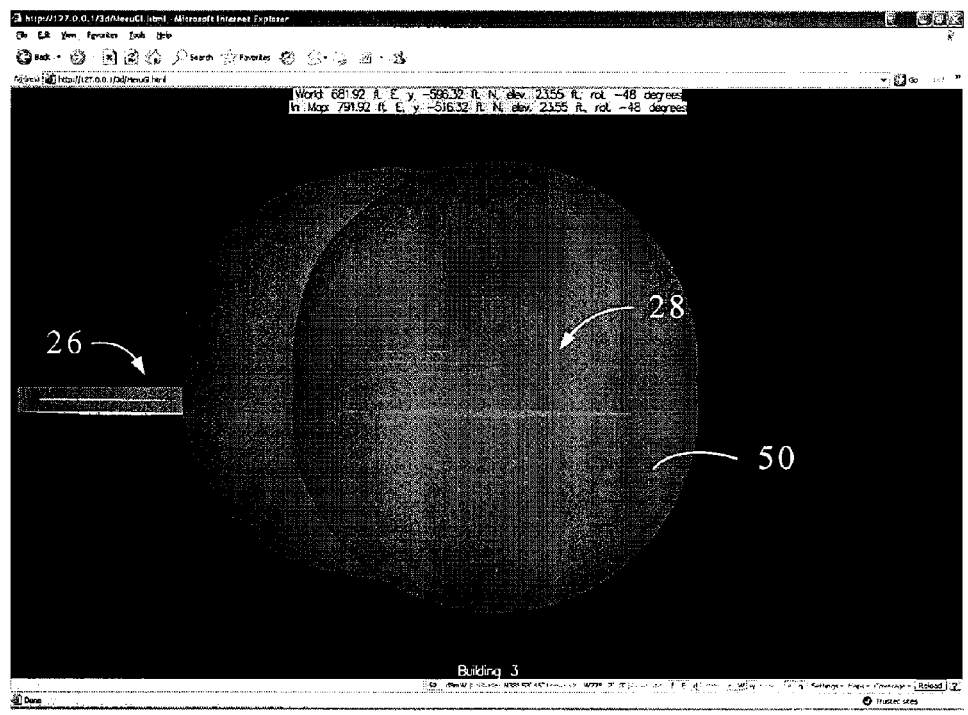
FIG. 8 illustrates the VR environment of FIG. 7 viewed from a different angle and zoomed-out, and showing the fields with the cutoff interactively set to −50 dBmW.
Figure 9:
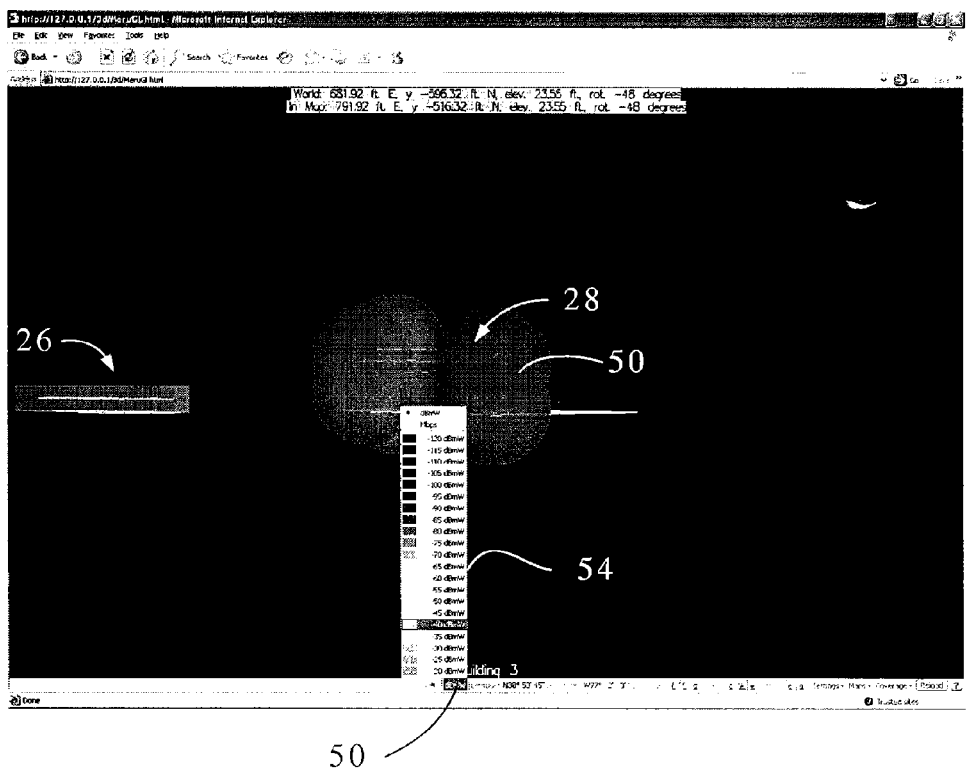
FIG. 9 illustrates the VR environment of FIG. 8 showing the fields with the cutoff interactively set to −40 dBmW.
Figure 10:
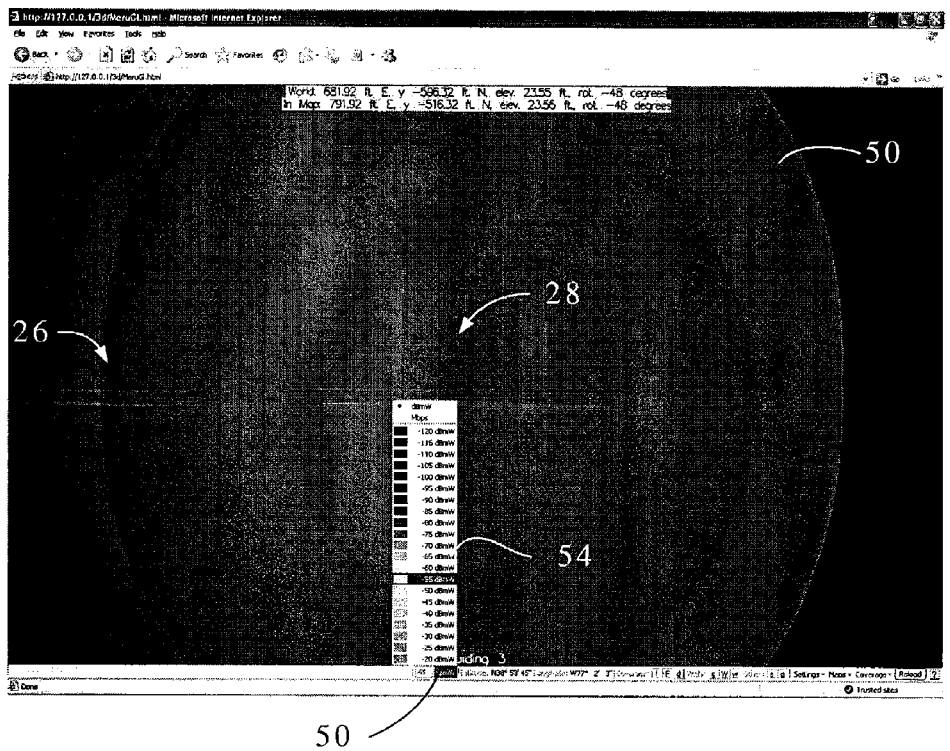
FIG. 10 illustrates the VR environment of FIG. 8 showing the fields with the cutoff interactively set to −55 dBmW.

FIGS. 8-10 illustrate the wireless field displayed at various cutoff points selected by the user. For example, at −50 dBmW the wireless field 50 completely engulfs the virtual building 28 (FIG. 8). The user may change the cutoff display setting by selecting the cutoff 52 at the bottom of the display window with the cursor. A menu 54 may be displayed to allow the user to select the desired cutoff for display of the selected network parameter. For example, the power level selected in FIG. 9 is −40 dBmW and −55 dBmW in FIG. 10.

Figure 11:
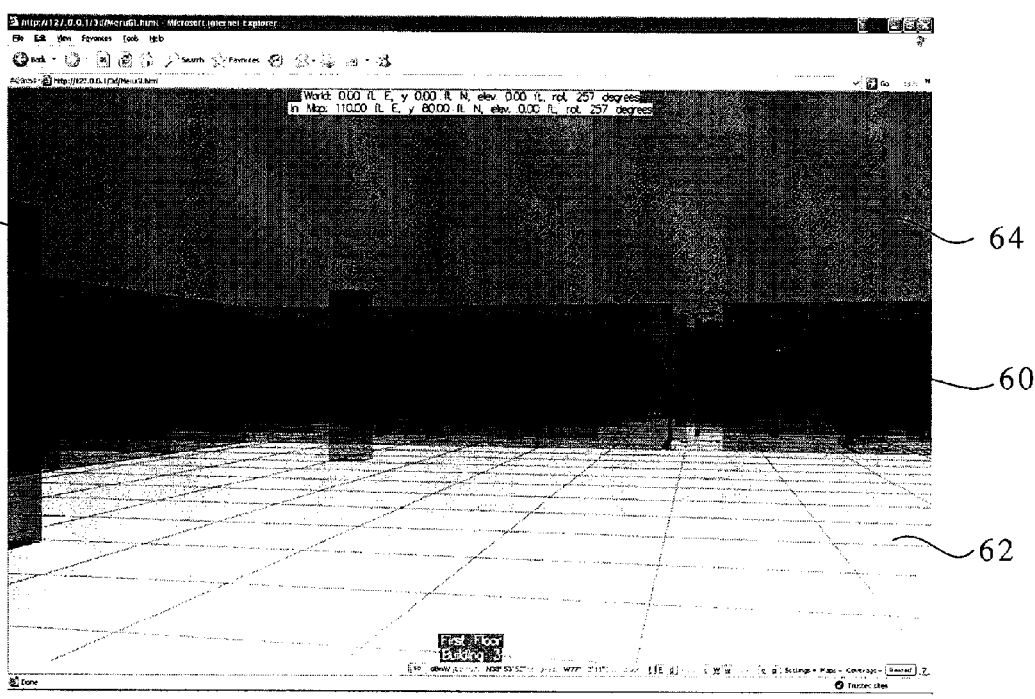
FIG. 11 illustrates the first floor of a building with translucent walls.
Figure 12:
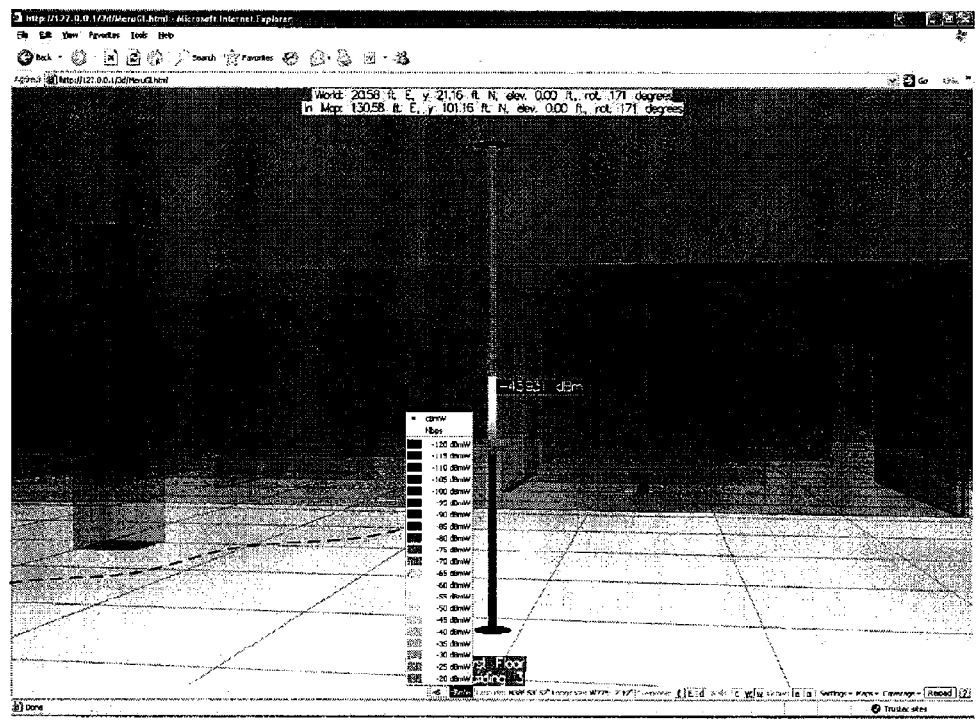
FIG. 12 illustrates shaded translucent walls with a single-field dipstick and cutoff.
Figure 13:
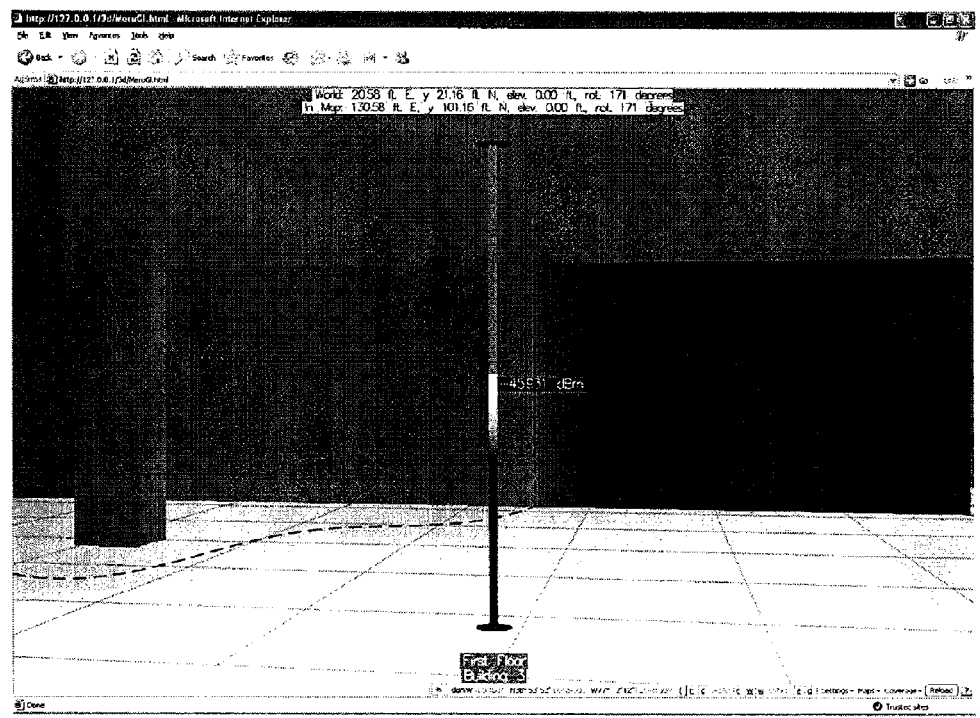
FIG. 13 illustrates shaded opaque walls with a single-field dipstick and cutoff.

Referring to FIGS. 11-13, the VR environment may present the wireless field either with or without concurrently presenting physical boundary surfaces such as walls 60, floor 62, ceiling 64, desks and cubical walls (not shown in these figures), for example. These boundary surfaces may be transparent, translucent or opaque and color coded to provide a visual indication of the surface being viewed. The boundary surfaces may be overlaid on the 3D wireless field to provide a visual representation of the space or area being viewed with respect to the wireless signal strength or other wireless parameter of interest, at any point within that space. As illustrated in FIG. 11, the ceiling 64 and floor 62 are opaque and the walls 60 and columns 61 are translucent and the environment is displayed in grayscale. The user may select any combination of grayscale, color, network parameters, transparency and/or texture to view the network environment.

In FIG. 12, a "dipstick" 70 is displayed and the extent of the network coverage (shown as a broken line) is displayed as green shading 65 on the floor 62 and translucent or transparent walls 60. In FIG. 13, the walls 62 have been changed to be opaque which more clearly shows the network boundary in relation to the wall.

Referring to FIGS. 14-17, the dipstick 70 may be used to virtually measure any signal parameter at any desired virtual location within a virtual building for display on the user's console. In the figures, the signal strength is illustrated but it should be understood that other network parameters may be selected and displayed in place of or in addition to the signal strength. The dipstick 70 represents a virtual measurement of various signal parameters at one or more points along a vertical axis to provide a signal gradient within the measured environment in relation to an access point 72, sensors, mobile stations, and other network devices. The signal gradient may be displayed as a color range from green (good) to red (bad), for example. The dipstick 70 may measure the signal parameters along the vertical axis for one or more channels. A grayscale or other representation may also be used to display the signal gradient.

The signal parameters represented by the dipstick 70 may include the received signal strength (RSS), and various signal quality or "goodness" parameters which may be measured and/or calculated such as signal-to-noise ratio (SNR), signal-to-interference ratio (SIR), bit error rate (BER), frame error rate (FER), or other wireless system performance metric used to monitor a wireless network. The user may select the particular parameter to be displayed by selecting the dipstick 70 and then selecting the parameter(s) from a popup menu, or choose to not display the dipstick 70 (see FIG. 15).

The dipstick may be movable or repositionable within the virtual environment to any location desired. The dipstick may move with the operator with the operator "walking" or "flying" through the virtual building so that the signal strength, or other parameter, is displayed for any desired location within the virtual building. The particular signal parameter selected by the user to be displayed is determined by readings from APs, sensors, mobile stations and other network devices in the area corresponding to the location of the dipstick. The particular signal parameter may be displayed as a floating meter or other indication or value to convey the desired information at a particular location in the virtual structure. Although in the figures the dipstick is shown as a vertical bar, any other suitable graphic might be substituted, e.g., a horizontal bar, a circular or otherwise-shaped graph, and the like.

The graphical and/or textual representation of the 3D virtual reality structure is continually updated based on input from one or more mobile stations, sensors, dongles or access points measuring the various wireless parameters. Virtual dipsticks may be utilized to walk throughout the virtual environment to assess the wireless network at any location without physically being at the actual location of the wireless network. The network administrator may reposition the dipstick or navigate through the virtual building corresponding to an actual structure, and monitor the wireless network parameters. In this manner, a network administrator may monitor multiple environments from a single location without physically being present in the particular building.

The performance of the wireless network is calculated and displayed in color and/or text as selected by the network administrator. For boundary calculations, loss values may be calculated based on data well known in the art for various materials volumes and densities in conjunction with signal attenuation from the wireless source to the measurement point. The boundary surface is the edge of the attenuating volume. Based on the density and volume of the boundary surface, the intersection of the radio frequency (RF) field and the boundary surface may be represented in 2D as the intersection of a line and the pixels representing the boundary surface. The scattering and diffusion of the wireless signal may also be calculated from known parameters for a particular material.

Figure 14:
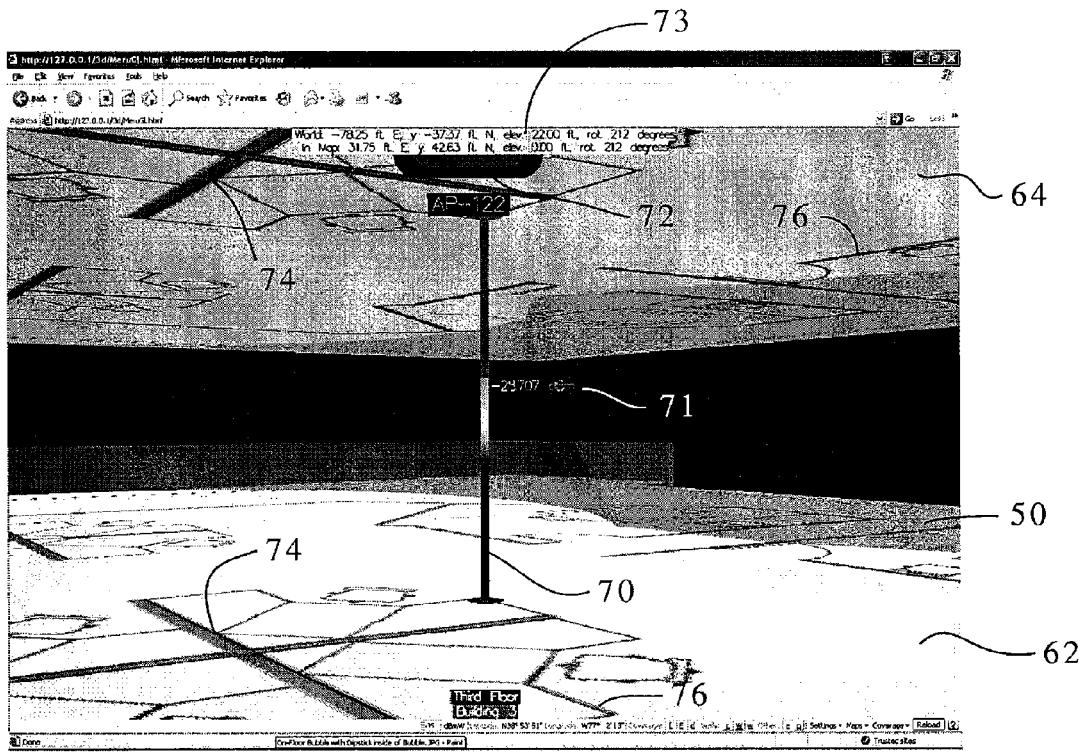
FIG. 14 illustrates an on-floor field with the dipstick inside the field and viewed from inside the field.
Figure 15:
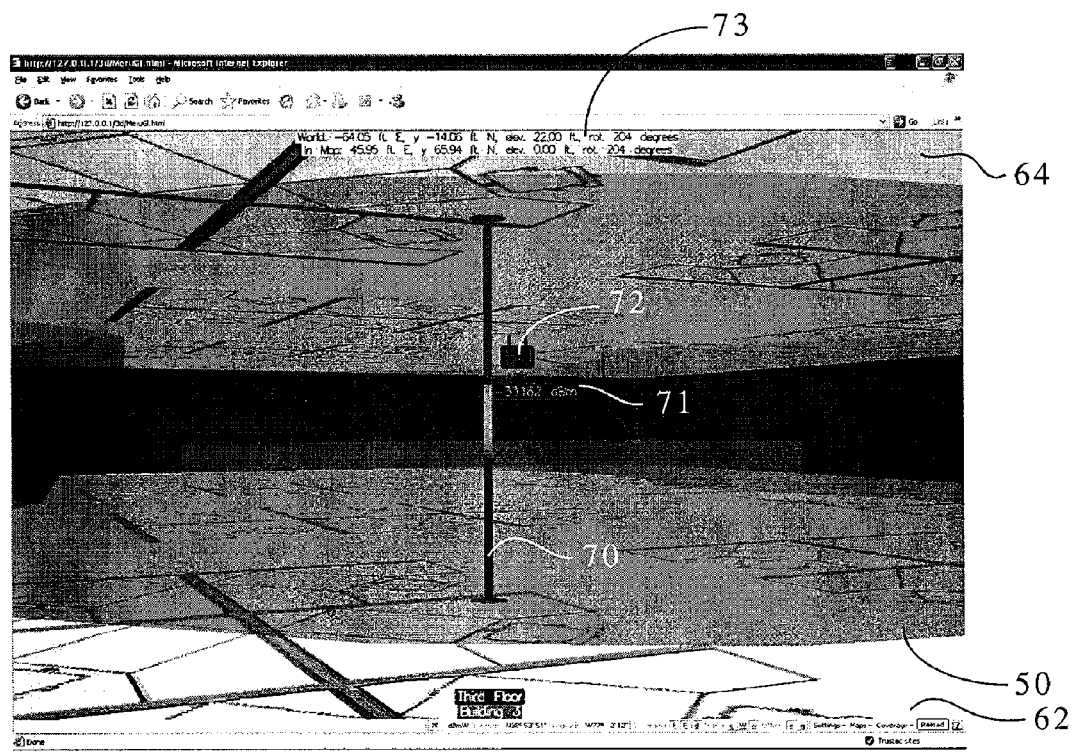
FIG. 15 illustrates an on-floor field with the dipstick inside the field and viewed from outside the field.
Figure 16:
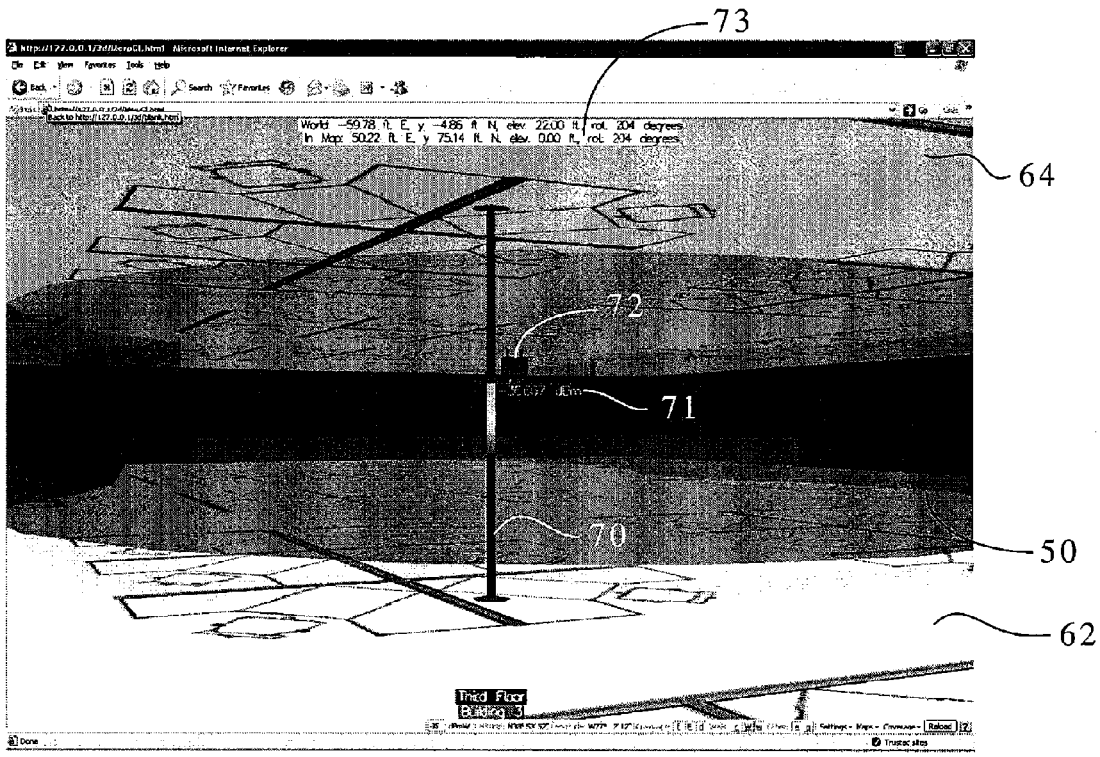
FIG. 16 illustrates on on-floor field with the dipstick on the outside of the field.
Figure 17:
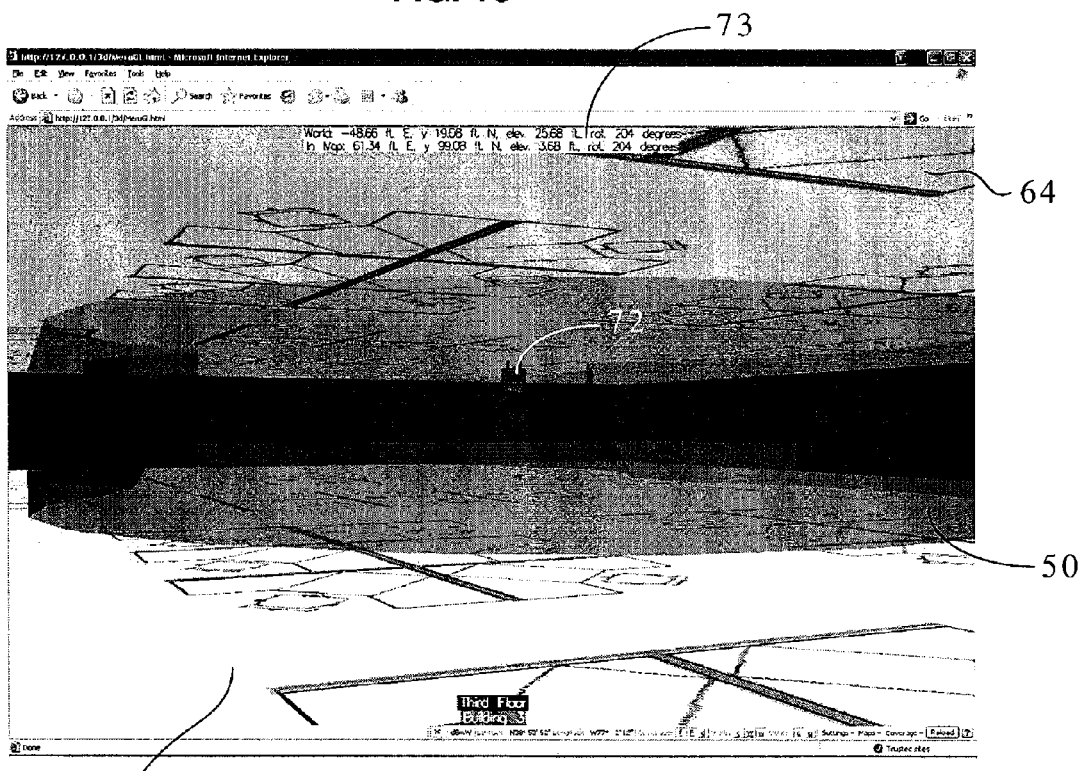
FIG. 17 illustrates an on-floor field with the dipstick not shown.

As shown in FIG. 14, the dipstick 70 is located within the field 50 and the viewer is also within the field. Cubicle partitions 74 and desk outlines 76 are shown projected on the floor 62 and ceiling 64. The signal strength 71 at the location of the dipstick is displayed next to the dipstick 70. Specific location information in local and world coordinates are displayed 73 at the top of the window. In FIG. 15 the dipstick 70 is still located inside the field 50 but the viewer has moved outside the field 50. The view has rotated and the location of the dipstick 70 has moved as shown in the coordinate display 73, and as reflected by the change in the signal strength 71. In FIG. 16, the dipstick 70 is moved outside the field 50. The view is from the same angle and elevation as shown in FIG. 17 with the viewer moved back slightly, with the effect of zooming-out the display. The signal strength 71 reflects that the dipstick 70 has moved beyond the field 50 which is displayed for a cutoff strength of −35 dBmW. FIG. 17 is essentially the same as FIG. 16, with the viewer moved back slightly and the dipstick not displayed.

Figure 18:
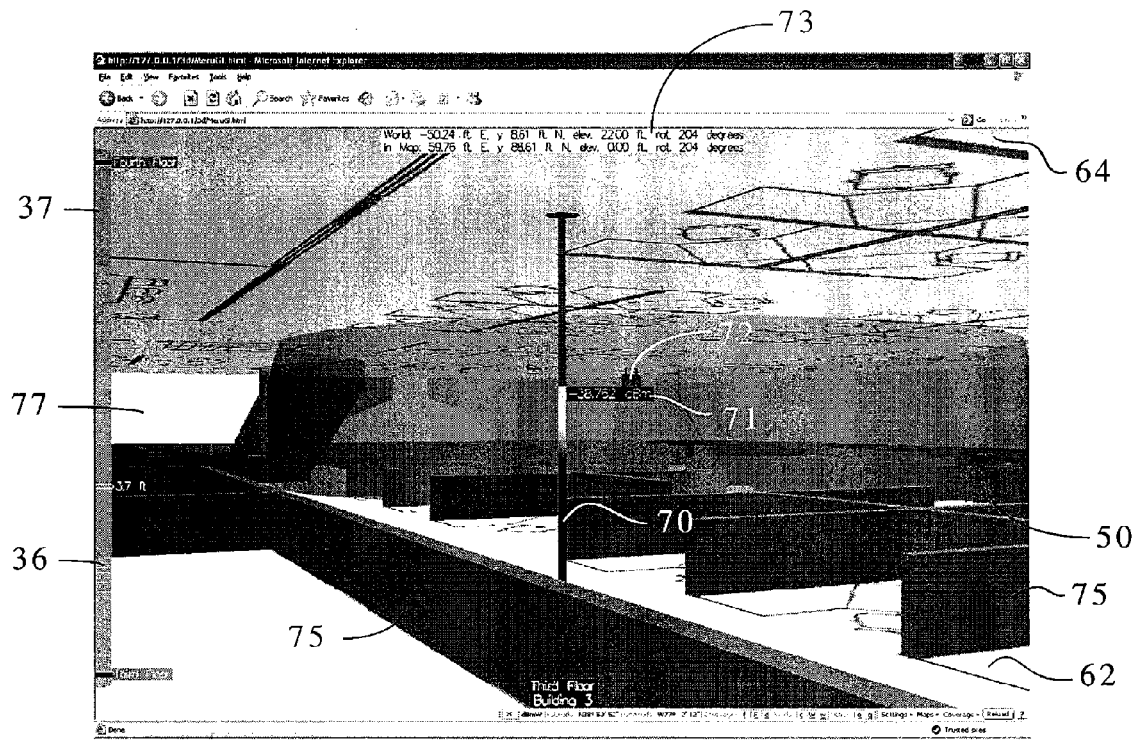
FIG. 18 illustrates shaded half-height opaque walls on the third floor with a single-field dipstick, cutoff, and altimeter.
Figure 19:
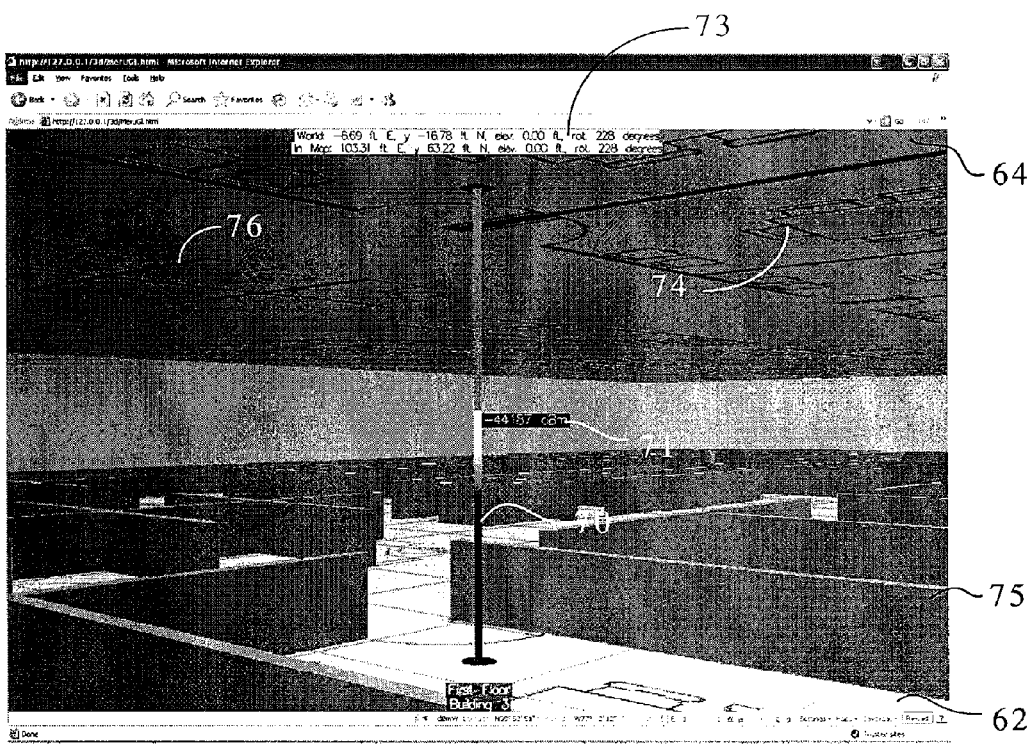
FIG. 19 illustrates shaded half-height opaque walls on the first floor with a single-field dipstick, cutoff, and altimeter.
Figure 20:
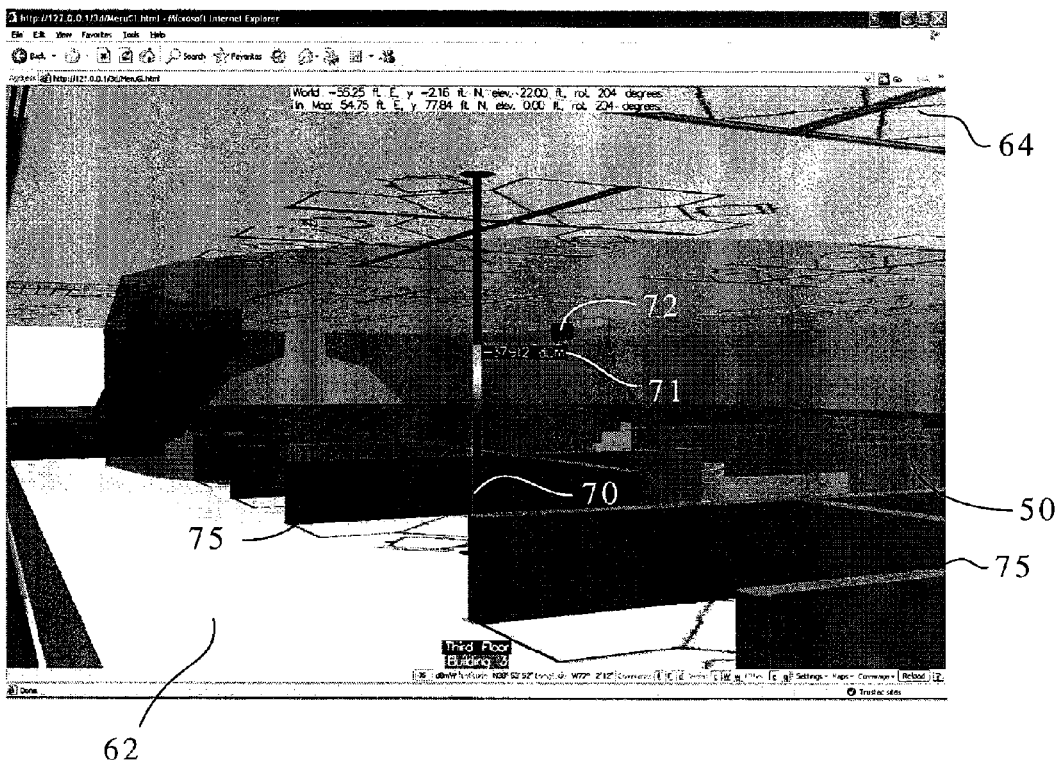
FIG. 20 illustrates shaded half-height opaque walls with on-floor field.
Figure 21:
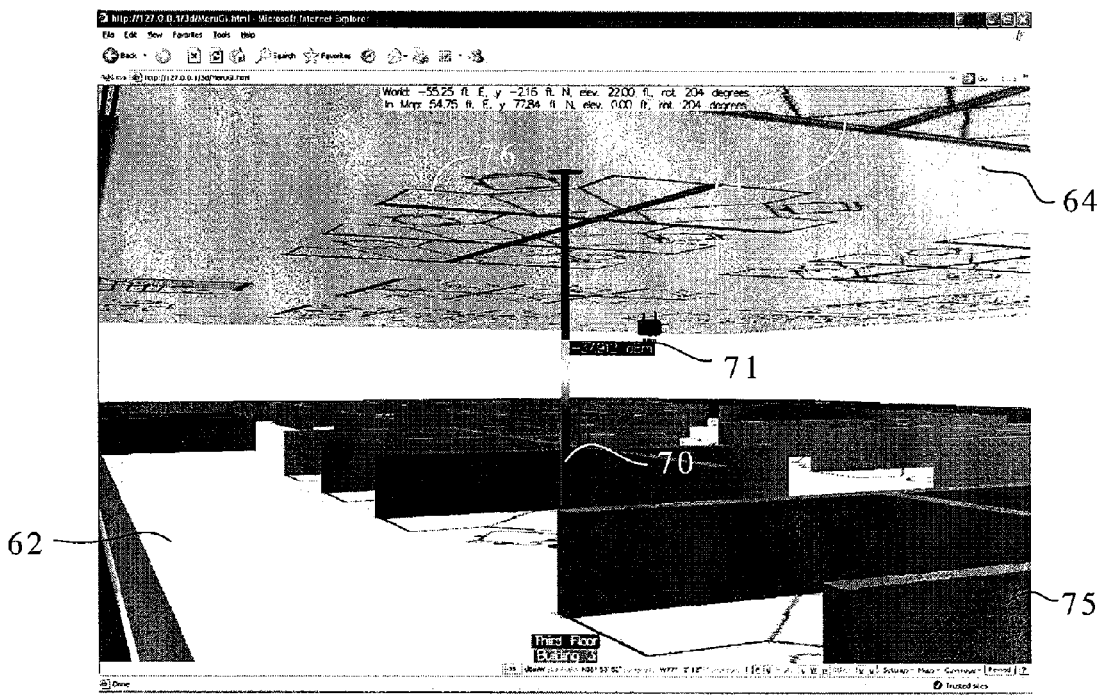
FIG. 21 illustrates shaded half-height opaque walls without on-floor field.
Figure 22:
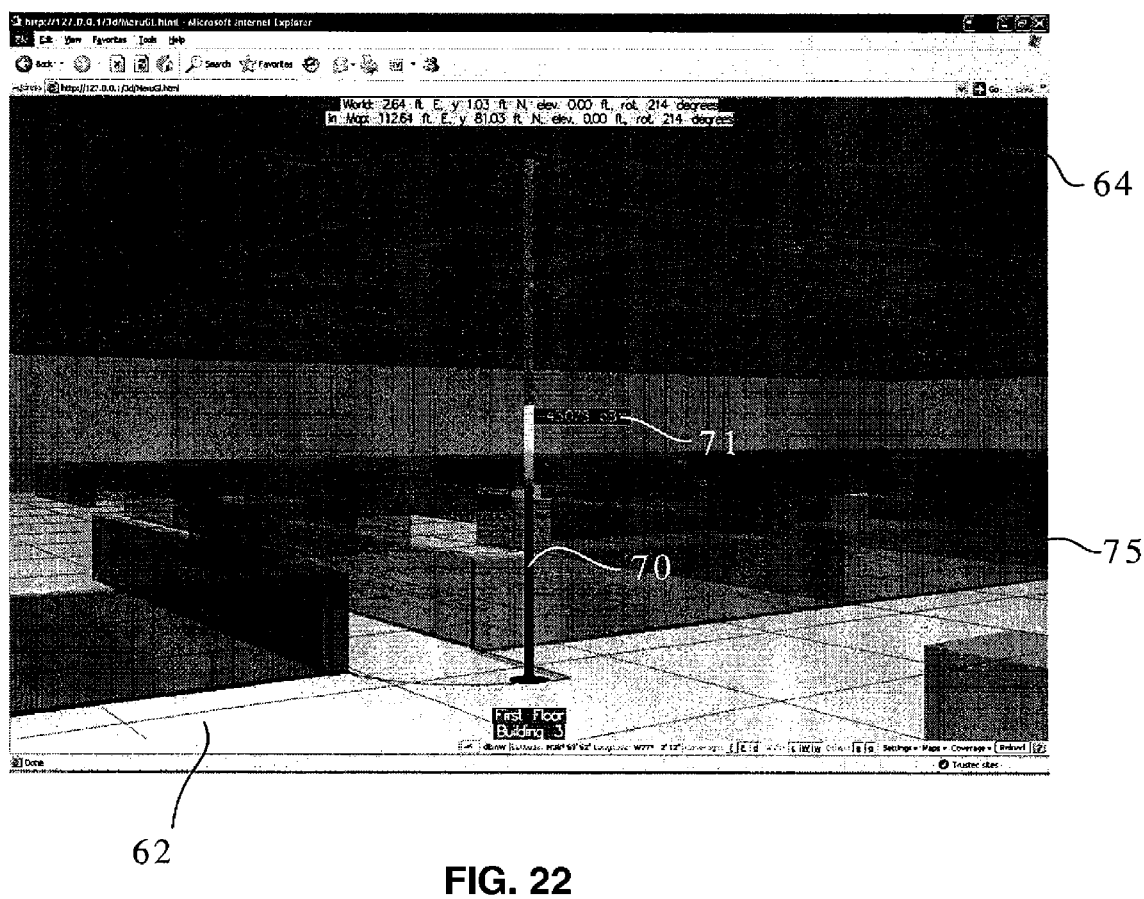
FIG. 22 illustrates shaded half-height translucent walls on the first floor with a single-field dipstick, cutoff, and altimeter.

Referring to FIGS. 18-22, cubical partitions 75 may be shown as opaque (FIGS. 18-21) or translucent (FIG. 22). The partitions 75 may be displayed as half-height walls to allow the user to peer over the wall to the other side. Alternatively, the user may choose to change the display scale of perimeter walls 77 without changing the display scale of the partitions or interior walls 75 giving the appearance that the cubicle walls 75 are half-height and at the same time allowing the user to peer over the walls. The altimeter 36 shows the elevation of the viewer and also indicates the levels of the 3rd and 4th floors. Shading 37 on the altimeter 36 indicates the location of the ceiling and space between the 3rd floor ceiling and the 4th floor. The cubical partitions 74 and furniture 76 outlines or footprints are projected onto the ceiling 64 and floor 62 of the 3D virtual reality display to provide visual and spatial cues without unnecessarily obstructing the display. In FIGS. 18 and 20, the dipstick 70 is located outside the field 50, which is displayed extending from the floor 62 to the ceiling 64. In FIG. 19, the dipstick is located within the field 50. In FIGS. 19 and 21, the boundary of the field 50 is not displayed but the area within the field including cubicle walls 75, is shaded in green to show the network coverage at a cutoff of −45 dBmW. In FIG. 22, the cubicle walls 75 are transparent and shaded green to show the area within the field. The floor 62 is shaded green to indicate the area within the cutoff of the network signal and white to indicate the area outside of the network cutoff.

Figure 23:
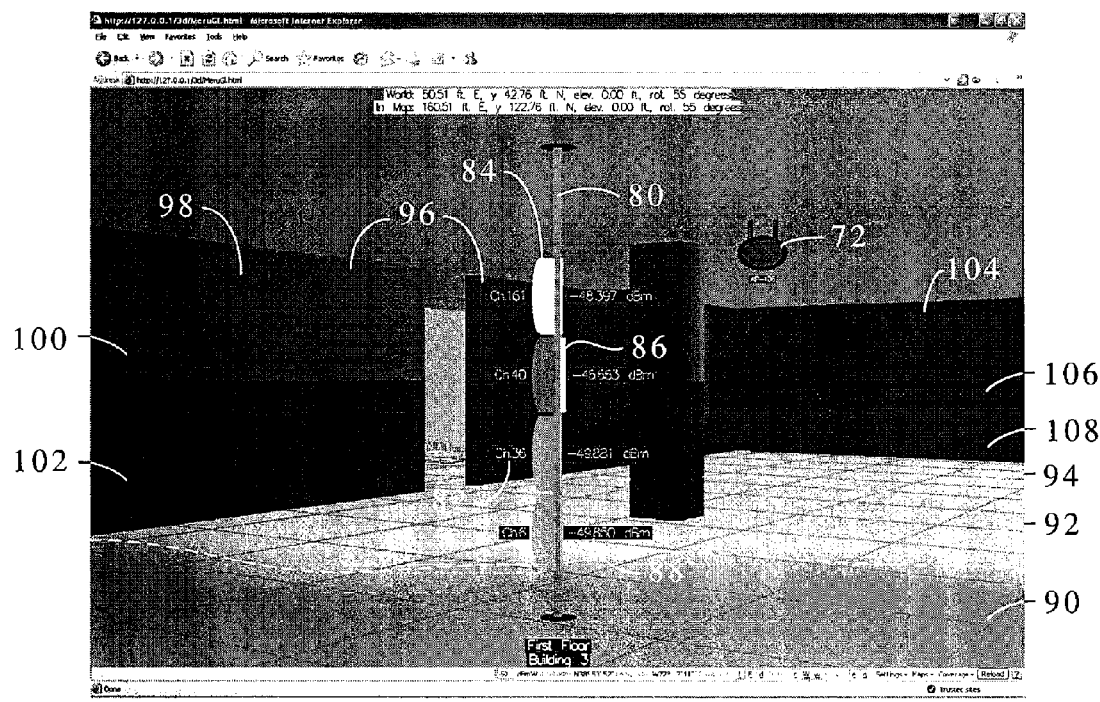
FIG. 23 illustrates shaded opaque walls with a multi-field dipstick and cutoff.

Referring to FIG. 23, a multi-channel dipstick 80 is illustrated. While in one embodiment, each channel represents a distinct wireless communication frequency, it is of course possible for channels to be distinguished on other bases, e.g., CDMA, TDMA, and the like. Four channels have been selected by the user to be displayed on the dipstick 80. Each channel is identified by a label 82 and a color 84 projecting from one side of the dipstick 80. A graphical representation of the signal strength, shown as a green flag 86, for a channel is projected from the opposite side of the dipstick 80. The size of the flag 86 provides the user with a visual indication of the signal strength for that channel and signal cutoff. The measured signal strength may also be displayed in a text box 88 next to the flag 86. The floor is divided into three areas of varying shades of blue. The first area 90 is the darkest shade of blue and represents the area in which the signal strength for all four channels is above the cutoff. In the second area 92, only two of the channels are above the cutoff. In the third area 94, only one channel is above the cutoff.

The walls 96 also provide a visual indication of the number of channels above the selected cutoff. For example, the section of wall 98 within the second area 92 is divided with upper half 100 gray, and the lower half 102 dark blue. Because four channels are being displayed and half of the wall is shaded blue, then two channels are above the cutoff. Similarly, the section of wall 104 within the third area 94 is divided with the upper three-quarters 106 gray and the lower quarter 108 dark blue indicating that only one channel is above the cutoff at this wall 104.

Figure 24:
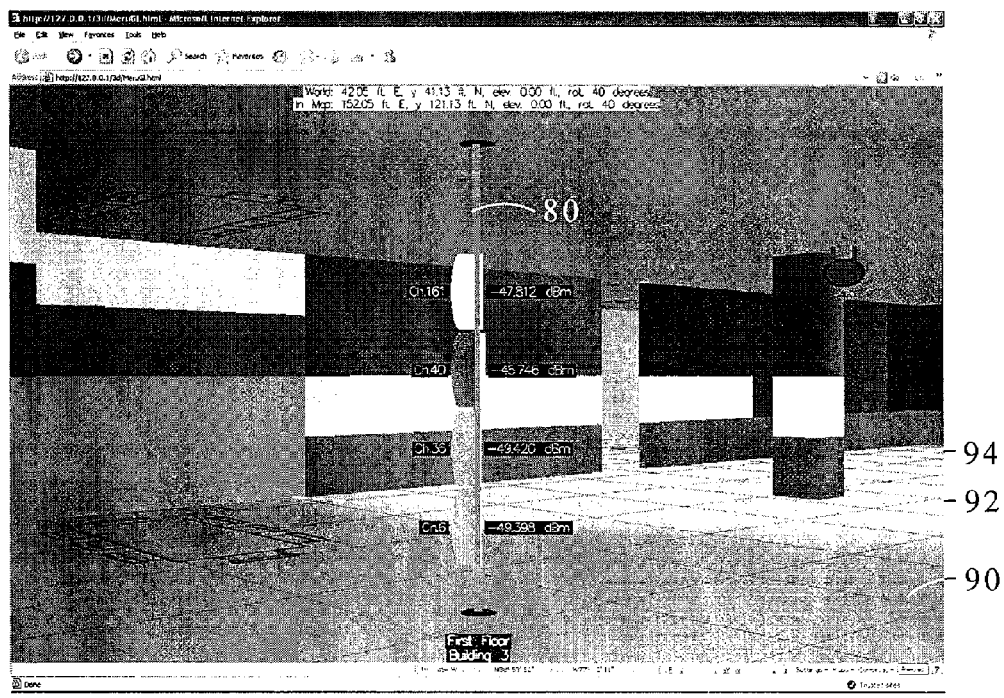
FIG. 24 illustrates banded opaque walls with a multi-field dipstick and cutoff.

Referring to FIG. 24, color bands are projected onto the walls 96 corresponding to the channel colors selected for the multi-channel dipstick 80. On the first section of the wall corresponding to the first area 90, all bands are shown indicating that all channels are above the cutoff. In the second section of the wall corresponding to the second area 92, only the yellow and pink channels are above the cutoff. In the third section of the wall corresponding to the third area 94, only the pink channel is above the cutoff. With this display, the user can immediately tell which channels are available in which areas.

For the example illustrated in FIG. 24, the user selected four channels to display on the dipstick 80 based on the selected cutoff. The user may select any field to be displayed for a selected channel. Additionally, the user may choose to display different parameters for one channel.

For a particular point on the dipstick 80, the RSS may be projected in a horizontal plane onto the surrounding virtual walls 82. Colors may be displayed in bands 84 on the walls to indicate the signal strength for a particular channel. Textures may also be used alone or in combination with colors to indicate one or more signal parameters. Numerical values 86 may also be displayed for any desired parameter. It should be understood that measurements are not limited to signal strength. Other network parameters such as SSID, service, security parameters, physical properties, signal or radio type, and state of the signal generators may also be measured and displayed on the user's console.

The color projected on the virtual wall 82 may be different from the color corresponding to the actual measured parameter depending on the distance from the wireless AP 72 to the dipstick 80, the dipstick 80 to the virtual wall 82, and the virtual wall 82 to the AP 72. Using well known attenuation calculations to determine losses from a source to a measurement point, the precise signal strength may be calculated for all points within the virtual environment.

Figure 25:
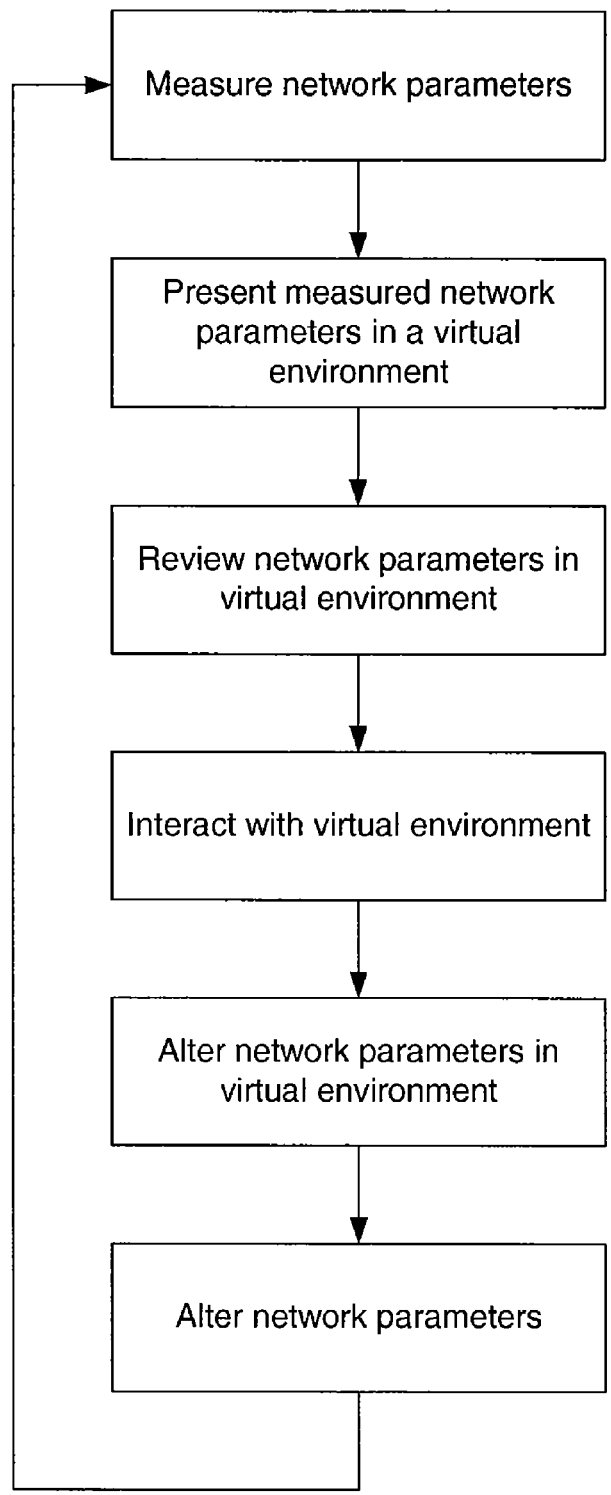
FIG. 25 is a flow chart illustrating the method for interacting and manipulating parameters in a virtual environment.

Referring to FIGS. 3 and 25, in the network environment 28, network parameters are measured 120 by sensors 38 and APs 36, for example. The measured information is collected by the virtual environment presenting device 44 for display on the console 20 in the virtual environment 122. The user 23 reviews the information 124, and can move around in the virtual environment 126. Depending on the user's privileges, the user may alter network parameters 128 from the console 22. Any changes to the network parameters made by the user in the virtual environment are transmitted to the physical network devices 130.

Performance with MIMO

One aspect of wireless communication systems is the use of MIMO, now available as part of the IEEE 802.11n standard. MIMO makes use of multiple physical pathways between sender and receiver antennas, with the effect of achieving higher data rate under otherwise identical conditions. One common metric for surveying or monitoring the potential for performance in wireless networks has been signal strength (alternatively measured as a signal to noise ratio). The rate at which information can be transmitted goes up with the signal to noise ratio. Moreover, radio receivers have practical limits for a minimum signal strength for the radio to receive and decode an incoming signal; these practical limits generally require higher signal strengths to achieve higher data rates of transmission.

For example, one manufacturer of 802.11 radios provides the following table of minimum signal strengths for receiving at data rates for 802.11a:

| SIGNAL STRENGTH | DATA RATE |
| --- | --- |
| −86 dBm @ 6 Mb/s | −85 dBm @ 9 Mb/s |
| −82 dBm @ 12 Mb/s | −81 dBm @ 18 Mb/s |
| −80 dBm @ 24 Mb/s | −79 dBm @ 36 Mb/s |
| −74 dBm @ 48 Mb/s | −73 dBm @ 54 Mb/s |

With this information, a system can predict a maximum supportable physical layer data rate (in Mb/s) installed radios.

However, MIMO-based radios use an additional property of the wireless channel to be able to support higher data rates. This additional property is fundamentally related to the structure of the channel between the sets of now multiple transmit and receive antennas, rather than the average signal strength of the signal from all antennas. This second property cannot be easily predicted, as it depends on multiple interactions of the radio waves with objects both near and far to the radios. For example, the same manufacturer as above cites the following table as the minimum signal strengths for receiving at data rates for 5-GHz 802.11n, using MIMO.

| SIGNAL STRENGTH | DATA RATE |
| --- | --- |
| −85 dBm @ MCS0 | −84 dBm @ MCS1 |
| −83 dBm @ MCS2 | −82 dBm @ MCS3 |
| −79 dBm @ MCS4 | −74 dBm @ MCS5 |
| −73 dBm @ MCS6 | −72 dBm @ MCS7 |
| −85 dBm @ MCS8 | −84 dBm @ MCS9 |
| −83 dBm @ MCS10 | −82 dBm @ MCS11 |
| −79 dBm @ MCS12 | −74 dBm @ MCS13 |
| −73 dBm @ MCS14 | −72 dBm @ MCS15 |

In this table, MCS0 through MCS7 represent transmissions sent with one spatial stream, while MCS8 through MCS15 represent transmissions sent with two spatial streams. Using the following table to convert from MCS to data rate, it is easy to see that with two spatial streams it is possible to achieve data rates double that of one spatial stream, but with no higher signal strength requirements.

| MCS | Mb/s |
| --- | --- |
| 0 | 6.5 |
| 1 | 13 |
| 2 | 9.5 |
| 3 | 26 |
| 4 | 39 |
| 5 | 52 |
| 6 | 58.5 |
| 7 | 65 |
| 8 | 13 |
| 9 | 26 |
| 10 | 39 |
| 11 | 52 |
| 12 | 78 |
| 13 | 104 |
| 14 | 117 |
| 15 | 130 |

A second factor that determines whether one or two spatial streams can be used is the MIMO stream capacity. The problem is to be able to measure or infer that capacity from a running wireless system and present this to the user in a meaningful way. This is especially tricky considering that the stream capacity changes over time and is not usually available from most radio hardware in the same way as signal strength is.

Multi-rate wireless technologies, such as 802.11 and its variants, often place the burden of choosing the data rate that is both simultaneously as high as possible, and yet is able to withstand the channel conditions (signal strength and stream capacity) and arrive with relatively low chance of error. In 802.11n, for example, two-stream-capable devices can choose any of the 16 MCS rates, for any reason. This choice is usually—but not necessarily—dictated on integrating minimum signal strength requirements with prior observed loss rates for each data rate. Therefore, a device that sees −65 dBm from its wireless peer can transmit at MCS15 or MCS7. The choice is up to the device, though the success is constrained by the stream capacity.

As the recipient of traffic, a wireless radio can note the selection of data rates by the peer, and measure the difference of the fraction of data rates that have different numbers of streams, and use that to infer the effects of the stream capacity on the network. Thus, if an 802.11n radio receives, from a client known to support two streams, more traffic that is one-stream than two-streams, then the radio can infer that the stream capacity favors one stream. Let Fi be the number of frames received, in a given interval, with i streams. Then the inferred stream capacity is the weighted average SUM(i*Fi)/SUM(Fi). The transmitter may also observe its own rate adaptation behavior, and use the number of successful transmissions (those with success acknowledgements received at any layer) to compose Fi.

If the rate adaptation algorithm is known in advance, then it is possible to fine-tune the observation process to increase the accuracy. For example, some implementations strictly order the data rates by rate, removing any rates that require higher signal strength but are lower than others. For example, one ordering of 802.11n rates for rate adaptation is

| Rate | MCS |
|---|---|
| 0 | 6.5 |
| 1 | 13 |
| 2 | 9.5 |
| 3 | 26 |
| 4 | 39 |
| 11 | 52 |
| 12 | 78 |
| 13 | 104 |
| 14 | 117 |
| 15 | 130 |

In this example, rates MCS3 and MCS11, and MCS4 and MCS12, have the same signal strength requirements. Thus, these rates are ordered such that, if the higher data rate has more loss that it can handle, the rate will be unused. Since the rates are ordered by capacity, with that knowledge in hand, one can construct the inferred stream capacity $$(1*F[3]+1*F[4]+2*F[11]+2*F[12])/(F[3]+F[4]+F[11]+F[12]),$$

where F[j] is the number of data packets at MCS j.

This method works for both transmit antennas and receive antennas.

The invention can be useful for visualizing and/or configuring the multiple physical pathways between sender and receiver antennas used by MIMO. The invention is not limited to this application.

It is to be understood that while certain forms of this invention have been illustrated and described, it is not limited thereto, except in so far as such limitations are included in the following claims and allowable equivalents thereof.

The invention claimed is:

1. A method, including steps of:
    measuring a parameter of a wireless device, including determining a received signal strength;
    presenting said parameter in a virtual environment, including overlaying said measured parameter on said virtual environment, wherein overlaying includes displaying said measured parameter in a color distinguishable from said virtual environment and projecting said measured parameter in a color on said virtual environment;
    modifying a virtual setting in said virtual environment corresponding to said parameter; and
    altering a real setting of said wireless device corresponding to said virtual setting.

2. The method of claim 1, wherein said presenting step includes displaying a dipstick to selectively present said measured parameters.

3. The method of claim 1, including navigating through said virtual environment.

4. The method of claim 1, including changing a viewed perspective of said virtual environment.

5. The method of claim 1, including locating obstructions within said virtual environment.

6. The method of claim 5, wherein said obstructions are displayed in said virtual environment.

7. The method of claim 1, including locating one or more network devices within said virtual environment.

8. The method of claim 7, wherein said network devices are presented in said virtual environment.

9. A method, including steps of:
    positioning a sensor in a wireless network environment;
    measuring at least one wireless network parameter by said sensor;
    retrieving said measured parameter from said sensor; and
    presenting said parameter in a virtual environment, including overlaying said measured parameter on said virtual environment and displaying a dipstick to selectively present said network parameters.

10. The method of claim 9, including navigating through said virtual environments.

11. The method of claim 9, including changing a viewed perspective of said virtual environment.

12. The method of claim 9, including locating obstructions within said virtual environment.

13. The method of claim 12, wherein said obstructions are displayed in said virtual environment.

14. The method of claim 9, including locating one or more network devices within said virtual environment.

15. The method of claim 14, wherein said network devices are presented in said virtual environment.

16. A method of creating a virtual environment including steps of:
    specifying a perimeter of at least one floor corresponding to a physical floor, placing at least one network access point and at least one network sensor relative to said physical floor;
    determining locations of obstructions within said virtual environment, including associating a property for said obstructions;
    measuring network information from said network access point by said network sensor;
    displaying a virtual floor; and presenting said network information in said virtual environment, including overlaying said measured network information on said virtual environment and displaying a dipstick to selectively present said network information.

17. The method of claim 16, including navigating through said virtual environment.

18. The method of claim 16, including changing a viewed perspective of said virtual environment.

19. The method of claim 16, including obstructions within said virtual environment.

20. The method of claim 16, including locating one or more network devices within said virtual environment.

21. The method of claim 20, wherein said network devices are presented in said virtual environment.

22. A method, including steps of:
maintaining information relating to a wireless communication network, including receiving information from sensors related to that wireless communication network, wherein at least some of those sensors are passive devices relative to communication in that wireless communication network, and including steps of interpolating, extrapolating, or approximating information for locations other than those sensors related to that wireless communication network;
presenting that information in a virtual reality environment;
allowing a user to observe parameters of that wireless communication network in the virtual reality environment.

23. A method as in claim 22, wherein that information relating to a wireless communication network includes information relating to an IEEE 802.11 network.

24. A method as in claim 22, wherein the step of presenting includes steps of displaying properties of that wireless communication network using visual distinctions for surfaces in that virtual reality environment.

25. A method as in claim 24, wherein those visual distinctions include boundary surfaces, those boundary surfaces being responsive to that information relating to that wireless communication network.

26. A method as in claim 22, wherein the step of presenting that information includes steps of presenting one or more icons in that virtual reality environment.

27. A method as in claim 22, wherein the step of presenting that information includes steps of concurrently presenting one or more distinct elements or properties in that virtual reality environment.

28. A method as in claim 22, wherein the step of maintaining information includes steps of importing information from two dimensional images or maps.

* * * * *